(12) United States Patent
Ding et al.

(10) Patent No.: US 11,272,088 B2
(45) Date of Patent: Mar. 8, 2022

(54) CAMERA MODULE AND MOBILE TERMINAL

(71) Applicant: VIVO MOBILE COMMUNICATION CO., LTD., Chang'an Dongguan (CN)

(72) Inventors: Jian Ding, Chang'an Dongguan (CN); Junke Gao, Chang'an Dongguan (CN); Lijun Zhu, Chang'an Dongguan (CN); Kongkong Shang, Chang'an Dongguan (CN); Bijun Chen, Chang'an Dongguan (CN); Hongzhi Yao, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/981,575

(22) PCT Filed: Mar. 14, 2019

(86) PCT No.: PCT/CN2019/078123
§ 371 (c)(1),
(2) Date: Sep. 16, 2020

(87) PCT Pub. No.: WO2019/179353
PCT Pub. Date: Sep. 26, 2019

(65) Prior Publication Data
US 2021/0075944 A1  Mar. 11, 2021

(30) Foreign Application Priority Data

Mar. 20, 2018 (CN) .......................... 201810230491.7

(51) Int. Cl.
*H04N 5/225* (2006.01)
*G02B 13/00* (2006.01)
(Continued)

(52) U.S. Cl.
CPC ....... *H04N 5/2257* (2013.01); *G02B 13/0015* (2013.01); *H04M 1/0264* (2013.01);
(Continued)

(58) Field of Classification Search
CPC .......................... H04N 5/2258; H04M 1/0264
(Continued)

(56) References Cited

U.S. PATENT DOCUMENTS

| 2016/0091729 A1 | 3/2016 | Ollila |
| 2018/0196219 A1 | 7/2018 | O et al. |

(Continued)

FOREIGN PATENT DOCUMENTS

| CN | 204928997 U | 12/2015 |
| CN | 205545560 U | 8/2016 |

(Continued)

OTHER PUBLICATIONS

International Search Report & Written Opinion related to Application No. PCT/CN2019/078123; reported on Oct. 1, 2020.
(Continued)

*Primary Examiner* — Anthony J Daniels
(74) *Attorney, Agent, or Firm* — von Briesen & Roper, s.c.

(57) ABSTRACT

The present disclosure provides a camera module and a mobile terminal. The camera module includes: a first camera, a second camera, an optical image stabilization (OIS) chip and a bracket. The first camera and the second camera are embedded in the bracket. A height from a top surface of a lens of the first camera to a bottom surface of the first camera is greater than a height from a top surface of a lens of the second camera to a bottom surface of the second camera. One end of the first camera away from the lens is provided with a first printed circuit board, and the first printed circuit board extends to an outside of the first camera and faces the second camera. The OIS chip is disposed on the first printed circuit board and faces the bottom surface of the second camera; the OIS chip is electrically connected to the first printed circuit board.

20 Claims, 2 Drawing Sheets

(51) Int. Cl.
  *H04M 1/02* (2006.01)
  *H04N 5/232* (2006.01)
(52) U.S. Cl.
  CPC ........ *H04M 1/0277* (2013.01); *H04N 5/2252* (2013.01); *H04N 5/2328* (2013.01)
(58) Field of Classification Search
  USPC .......................................................... 348/374
  See application file for complete search history.

(56) References Cited

U.S. PATENT DOCUMENTS

2019/0253539 A1* 8/2019 Ma ........................ H04M 1/0264
2020/0322467 A1* 10/2020 Huh ......................... G06F 1/203

FOREIGN PATENT DOCUMENTS

| CN | 106131386 A | 11/2016 |
|----|----|----|
| CN | 106357990 A | 1/2017 |
| CN | 106454058 A | 2/2017 |
| CN | 206077561 U | 4/2017 |
| CN | 107483802 A | 12/2017 |
| CN | 206807579 U | 12/2017 |
| CN | 108174080 A | 6/2018 |
| CN | 207518710 U * | 6/2018 |
| CN | 207518710 U | 6/2018 |
| CN | 207968659 U | 10/2018 |
| WO | 2017003140 A1 | 1/2017 |
| WO | 2017174022 A2 | 10/2017 |
| WO | WO-2017174022 A2 * | 10/2017 |

OTHER PUBLICATIONS

Chinese Office Action for related Chinese Application No. 201810230491.7; reported on May 28, 2019.
Extended European Search Report for related Application No. 19770813.4; reported on Apr. 19, 2021.

* cited by examiner

CAMERA MODULE AND MOBILE TERMINAL

CROSS-REFERENCE TO RELATED APPLICATION

This patent application is a 35 USC § 371 U.S. national stage of International Application No. PCT/CN2019/078123 filed on Mar. 14, 2019, which claims the benefit and priority of Chinese Application No. 201810230491.7, filed on Mar. 20, 2018, the disclosures of which are incorporated in their entirety by reference herein.

TECHNICAL FIELD

The present disclosure relates to the field of communication technology, and in particular to a camera module and a mobile terminal.

BACKGROUND

The optical image stabilization (Optical Image Stabilization, OIS) technology has been widely used in mobile terminals, and its main function is to reduce image blur caused by jitter during photo shooting and to reduce shutter speed to obtain higher-quality images. At present, when laying out an OIS chip for a dual camera module in a mobile terminal, a printed circuit board (Printed Circuit Board, PCB) of a main camera usually extends out of a camera body to arrange the OIS chip. This enlarges volume of the camera module and also increases avoidance space of the motherboard of the mobile terminal.
SUMMARY

BRIEF DESCRIPTION OF THE DRAWINGS

In order to explain the technical solutions of the embodiments of the present disclosure more clearly, the drawings used in the description of the embodiments of the present disclosure are briefly introduced below. Obviously, the drawings in the following description are just some embodiments of the present disclosure. For those of ordinary skill in the art, other drawings can be obtained based on these drawings without creative labor.

DETAILED DESCRIPTION

The technical solutions in the embodiments of the present disclosure are clearly and completely described hereinafter with reference to the accompanying drawings in the embodiments of the present disclosure. Apparently, the described embodiments are a part of the embodiments of the present disclosure, but not all of the embodiments. All other embodiments obtained by those skilled in the art based on the embodiments of the present disclosure without creative labor are within the scope of the present disclosure.

Figure 1:
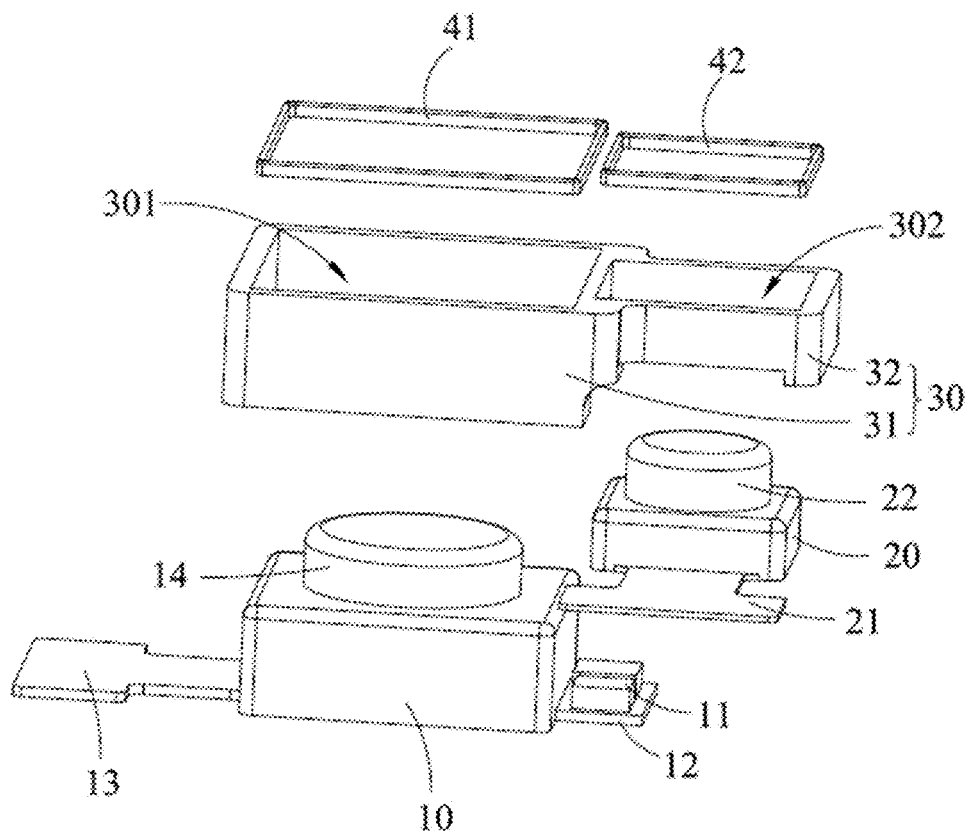
FIG. 1 is an exploded view of a camera module according to an embodiment of the present disclosure.
Figure 2:
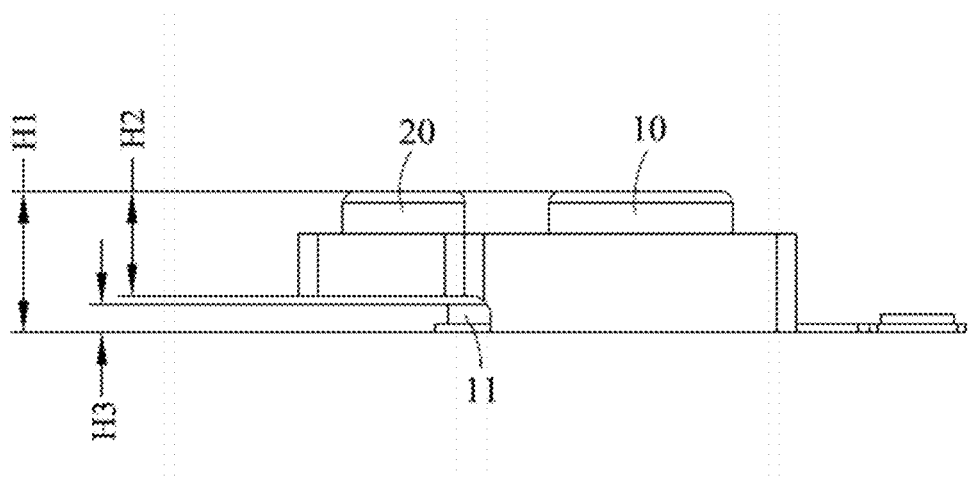
FIG. 2 is a schematic structural view of the camera module of FIG. 1.
Figure 3:
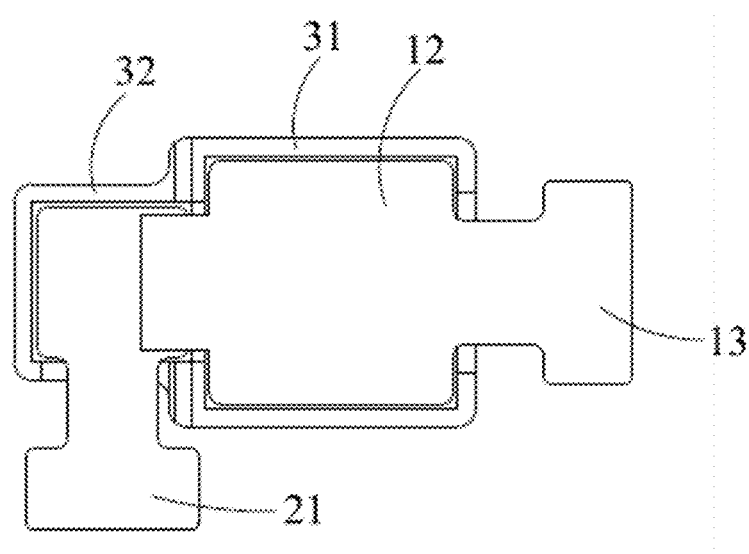
FIG. 3 is a bottom view of the camera module of FIG. 2.

Referring to FIG. 1 to FIG. 3, one embodiment of the present disclosure provides a camera module, including a first camera 10, a second camera 20, an OIS chip 11, and a bracket 30. The first camera 10 and the second camera 20 are embedded in the bracket 30. A height from a top surface of a lens 14 of the first camera 10 to a bottom surface of the first camera 10 is greater than a height from a top surface of a lens 22 of the second camera 20 to a bottom surface of the second camera 20. A first printed circuit board 12 is disposed at one end of the first camera 10 away from the lens. The first printed circuit board 12 extends to an outside of the first camera 10 and faces the second camera 20. The OIS chip 11 is disposed on the first printed circuit board 12 and faces the bottom surface of the second camera 20. The OIS chip 11 is electrically connected to the first printed circuit board 12.

It can be understood that the bracket 30 is used to fix the first camera 10 and the second camera 20. For example, the first camera 10 and the second camera 20 may be bonded or clamped to the bracket 30. The first camera 10 and the second camera 20 are arranged side by side, thereby achieving the purpose of simultaneously capturing images by the two cameras. A bottom of the first camera 10, i.e., one end away from the lens thereof, is provided with the first printed circuit board 12, and the first printed circuit board 12 extends to the outside of the first camera 10 and is located below the second camera 20. The OIS chip 11 is disposed on the first printed circuit board 12 and thus the OIS chip 11 is also located below the second camera 20. In this way, space under the second camera 20 is reasonably utilized, so that the arrangement of the OIS chip 11 does not need to additionally space in other orientations of the camera module, thereby reducing volume of the camera module, reducing avoidance space of the camera module in mobile terminal and then facilitating the layout of the camera module and other components in the mobile terminal.

In one embodiment of the present disclosure, the lens 14 of the first camera and the lens 22 of the second camera are arranged side by side, and the height from the top surface of the lens 14 of the first camera to the bottom surface of the first camera 10 is greater than the height from the top surface of the lens 22 of the second camera to the bottom surface of the second camera 20, that is, a height of the first camera 10 is greater than a height of the second camera 20. The arrangement of the first camera 10 and the second camera 20 may be that the top surface of the lens 14 of the first camera and the top surface of the lens 22 of the second camera are in a same plane, or, the top surface of the lens 14 of the first camera may be slightly higher than the top surface of the lens 22 of the second camera, or the top surface of the lens 22 of the second camera is slightly higher than the top surface of the lens 14 of the first camera. It should be noted that the bottom surface of the first camera 10 and the bottom surface of the second camera 20 are in different planes, that is, the bottom surface of the first camera 10 is connected to a motherboard of the mobile terminal, and the bottom surface of the second camera 20 is located above the motherboard. In one embodiment of the present disclosure, the bottom surface of the first camera 10 is provided with the first printed circuit board 12, that is, the height of the first camera 10 is a distance between the top surface of the lens 14 of the first camera and the bottom surface of the first printed circuit board 12. The first printed circuit board 12 is electrically connected to the motherboard.

Referring to FIG. 2, a sum of a height H3 from a top surface of the OIS chip 11 to a bottom surface of the first printed circuit board 12 and a height H2 from the top surface of the lens 22 of the second camera to the bottom surface of the second camera 20, is less than or equal to a height H1 from the top surface of the lens 14 of the first camera to the bottom surface of the first camera 10, that is, H2+H3≤H1. In this way, an occupied height of the camera module in the mobile terminal is the height H1 of the first camera 10. Optionally, the sum of the height H2 of the second camera 20 and the height H3 from the top surface of the OIS chip 11 to the bottom surface of the first printed circuit board 12, is less than the height H1 of the first camera 10, so that there is gap left between the top surface of the OIS chip 11 and the bottom surface of the second camera 20, thereby avoiding the second camera 20 from contacting the OIS chip 11 to prevent wear on the OIS chip 11, and facilitating heat dissipation of the OIS chip 11.

In one embodiment of the present disclosure, the top surface of the lens 14 of the first camera and the top surface of the lens 22 of the second camera are in the same plane. Since the sum of the height of the second camera 20 and the height of the OIS chip 11 does not exceed the height of the first camera 10, such an arrangement provides a larger installation space for the OIS chip 11 located below the second camera 20, which is convenient for installation layout of the OIS chip 11.

Specifically, referring to FIG. 1, the bracket 30 is provided with a first through hole 301 and a second through hole 302. The first through hole 301 and the second through hole 302 have a same opening direction, that is, the first through hole 301 is disposed alongside the second through hole 302. The first camera 10 is embedded in the first through hole 301. The second camera 20 is embedded in the second through hole 302. It can be understood that the first through hole 301 is disposed adjacent to the second through hole 302 so that the first camera 10 and the second camera 20 can be arranged side by side. It can be understood that the first camera 10 may extend through the first through hole 301, or a portion of the first camera 10 may be embedded in the first through hole 301; the second camera 20 may also extend through the second through hole 302, or a portion of the second camera 20 is embedded in the second through hole 302.

Optionally, the bracket 30 includes a first frame body 31 defining the first through hole 301 and a second frame body 32 defining the second through hole 302. A top surface of the first frame body 31 and a top surface of the second frame body 32 are located in a same plane, and a height from the top surface of the first frame body 31 to a bottom surface of the first frame body 31 is greater than a height from the top surface of the second frame body 32 to a bottom surface of the second frame body 32. It can be understood that the height of the first camera 10 is greater than the height of the second camera 20, then the height of the first frame body 31 is greater than the height of the second frame body 32, so that there is larger contact area between the first frame body 31 and the first camera 10, thereby ensuring stability of connection between the first camera 10 and the first frame body 31. Further, the top surface of the first frame body 31 and the top surface of the second frame body 32 are in the same plane, then there is a certain distance from the bottom surface of the second frame body 32 to the bottom surface of the first frame body 31, thereby facilitating arrangement of the OIS chip 11.

In one embodiment of the present disclosure, a sum of the height of the second frame body 32 and the height of the OIS chip 11 is less than or equal to the height of the first frame body 31. The top surface of the first camera 10 protrudes above the top surface of the first frame body 31, the top surface of the second camera 20 protrudes above the top surface of the second frame body 32, and the sum of the height of the second frame body 32 and the height of the OIS chip 11 is less than or equal to the height of the first frame body 31, thereby ensuring that the sum of the height of the second camera 20 and the height of the OIS chip 11 is less than or equal to the height of the first camera 10 and then ensuring the installation layout space of the OIS chip 11.

In one embodiment of the present disclosure, the lens 14 of the first camera protrudes from the first frame body 31, and the lens 22 of the second camera protrudes from the second frame body 32. Specifically, the bottom surface of the first camera 10 and the bottom surface of the first frame body 31 are in the same plane, and the lens 14 of the first camera protrudes above the first frame body 31; the bottom surface of the second camera 20 and the bottom surface of the second frame body 32 are in the same plane, the lens 22 of the second camera protrudes from the second frame body 32, and the top surface of the lens 14 of the first camera and the top surface of the lens 22 of the second camera are in a same plane. In this way, when the camera module is installed in the mobile terminal, the lens 14 of the first camera and the lens 22 of the second camera can protrude from a housing of the mobile terminal, thereby saving the space occupied by the camera module in the mobile terminal, which is conducive to development of thinning mobile terminals.

Optionally, a first glue 41 is disposed between the first camera 10 and the first frame body 31, and a second glue 42 is disposed between the second camera 20 and the second frame body 32. That is, the first camera 10 and the first frame body 31 are bonded by the first glue 41, and the second camera 20 and the second frame body 32 are bonded by the second glue 42. The bonding manner makes the connection of the bracket 30 with the first camera 10 and the second camera 20 simpler and more convenient.

In one embodiment of the present disclosure, one end of the first printed circuit board 12 facing the first through hole 301, is provided with a first flexible circuit board 13; one end of the second camera 20 facing the OIS chip 11 on the first printed circuit board is provided with a second flexible circuit board 21, and the second flexible circuit board 21 is electrically connected to the OIS chip 11. In this way, the height of the first camera 10 includes a height of the first flexible circuit board 13; compared with the first flexible circuit board 13 being arranged on one side of the first printed circuit board 12 away from the first through hole 301, this arrangement reasonably utilizes an inner space of the first camera 10 and then reduces the volume of the camera module, thereby saving the installation space of the camera module. The first flexible circuit board 13 is electrically connected to the first printed circuit board 12, the second flexible circuit board 21 is electrically connected to the OIS chip 11, and the OIS chip 11 is electrically connected to the first printed circuit board 12. In this way, the second flexible circuit board 21 is electrically connected to the first printed circuit board 12 through the OIS chip 11, thereby saving consumables of the camera module and then further saving the installation space of the camera module.

It should be noted that the first flexible circuit board 13 extends to an outside of one end of the bracket 30 away from the OIS chip 11. That is, one end of the first flexible circuit board 13 protruding from the bracket 30 and the OIS chip 11 are located at opposite sides of the bracket 30, respectively, thereby achieving electrical connection with the motherboard of the mobile terminal.

One embodiment of the present disclosure further provides a mobile terminal. The mobile terminal includes the foregoing camera module. Since the technical solutions of the present embodiment include all the technical solutions of the foregoing embodiments, at least all the technical effects of the foregoing embodiments can be achieved, which will not be repeated here.

The above are merely the optional embodiments of the present disclosure and shall not be used to limit the scope of the present disclosure. A person skilled in the art may make improvements and modifications without departing from the principle of the present disclosure, and these improvements and modifications shall also fall within the scope of the present disclosure. Therefore, the protection scope of the present disclosure should be determined by the scope of the claims.

What is claimed is:

1. A camera module, comprising: a first camera, a second camera, an optical image stabilization (OIS) chip and a bracket; wherein the first camera and the second camera are embedded in the bracket, a height from a top surface of a lens of the first camera to a bottom surface of the first camera is greater than a height from a top surface of a lens of the second camera to a bottom surface of the second camera; one end of the first camera away from the lens is provided with a first printed circuit board, and the first printed circuit board extends to an outside of the first camera and faces the second camera; the OIS chip is disposed on the first printed circuit board and faces the bottom surface of the second camera; the OIS chip is electrically connected to the first printed circuit board.

2. The camera module according to claim 1, wherein a sum of a height from a top surface of the OIS chip to a bottom surface of the first printed circuit board and the height from the top surface of the lens of the second camera to the bottom surface of the second camera, is less than or equal to the height from the top surface of the lens of the first camera to the bottom surface of the first camera.

3. The mobile terminal according to claim 2, wherein the bracket is provided with a first through hole and a second through hole; the first through hole and the second through hole have a same opening direction; the first camera is embedded in the first through hole; the second camera is embedded in the second through hole.

4. The camera module according to claim 1, wherein the top surface of the lens of the first camera and the top surface of the lens of the second camera are in a same plane.

5. The camera module according to claim 4, wherein the bracket is provided with a first through hole and a second through hole; the first through hole and the second through hole have a same opening direction; the first camera is embedded in the first through hole; the second camera is embedded in the second through hole.

6. The camera module according to claim 1, wherein the bracket is provided with a first through hole and a second through hole; the first through hole and the second through hole have a same opening direction; the first camera is embedded in the first through hole; the second camera is embedded in the second through hole.

7. The camera module according to claim 6, wherein the bracket comprises a first frame body defining the first through hole and a second frame body defining the second through hole; a top surface of the first frame body and a top surface of the second frame body are located in a same plane; and a height of the first frame body from the top surface of the first frame body to a bottom surface of the first frame body is greater than a height of the second frame body from the top surface of the second frame body to a bottom surface of the second frame body.

8. The camera module according to claim 7, wherein a sum of the height of the second frame body and a height of the OIS chip is less than or equal to the height of the first frame body.

9. The camera module according to claim 8, wherein the lens of the first camera protrudes from the first frame body, and the lens of the second camera protrudes from the second frame body.

10. The camera module according to claim 7, wherein a first glue is disposed between the first camera and the first frame body, and a second glue is disposed between the second camera and the second frame body.

11. The camera module according to claim 6, wherein one end of the first printed circuit board facing the first through hole, is provided with a flexible circuit board; the flexible circuit board extends to an outside of one end of the bracket away from the OIS chip.

12. A mobile terminal, comprising: a camera module; wherein the camera module comprises: a first camera, a second camera, an optical image stabilization (OIS) chip and a bracket; wherein the first camera and the second camera are embedded in the bracket, a height from a top surface of a lens of the first camera to a bottom surface of the first camera is greater than a height from a top surface of a lens of the second camera to a bottom surface of the second camera; one end of the first camera away from the lens is provided with a first printed circuit board, and the first printed circuit board extends to an outside of the first camera and faces the second camera; the OIS chip is disposed on the first printed circuit board and faces the bottom surface of the second camera; the OIS chip is electrically connected to the first printed circuit board.

13. The mobile terminal according to claim 12, wherein the mobile terminal further comprises a housing; the camera module is disposed in the housing; the lens of the first camera and the lens of the second camera protrude from the housing.

14. The mobile terminal according to claim 13, wherein the mobile terminal further comprises a motherboard disposed in the housing; the first printed circuit board is electrically connected to the motherboard.

15. The mobile terminal according to claim 14, wherein the bottom surface of the first camera is connected to the motherboard via the first printed circuit board; and the bottom surface of the second camera is above the motherboard.

16. The mobile terminal according to claim 12, wherein a sum of a height from a top surface of the OIS chip to a bottom surface of the first printed circuit board and the height from the top surface of the lens of the second camera to the bottom surface of the second camera, is less than or equal to the height from the top surface of the lens of the first camera to the bottom surface of the first camera.

17. The mobile terminal according to claim 12, wherein the top surface of the lens of the first camera and the top surface of the lens of the second camera are in a same plane.

18. The camera module according to claim 12, wherein the bracket is provided with a first through hole and a second through hole; the first through hole and the second through hole have a same opening direction; the first camera is embedded in the first through hole; the second camera is embedded in the second through hole.

19. The mobile terminal according to claim 18, wherein the bracket comprises a first frame body defining the first through hole and a second frame body defining the second through hole; a top surface of the first frame body and a top surface of the second frame body are located in a same plane; and a height of the first frame body from the top surface of the first frame body to a bottom surface of the first frame body is greater than a height of the second frame body from the top surface of the second frame body to a bottom surface of the second frame body.

20. The mobile terminal according to claim 19, wherein a sum of the height of the second frame body and a height of the OIS chip is less than or equal to the height of the first frame body.

* * * * *